US011100015B2

(12) United States Patent
Takeuchi

(10) Patent No.: US 11,100,015 B2
(45) Date of Patent: Aug. 24, 2021

(54) DATA TRANSMISSION/RECEPTION CONTROL SYSTEM, METHOD AND PROGRAM

(71) Applicant: NEC Corporation, Tokyo (JP)

(72) Inventor: Takashi Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 16/635,270

(22) PCT Filed: Jun. 4, 2018

(86) PCT No.: PCT/JP2018/021345
§ 371 (c)(1),
(2) Date: Jan. 30, 2020

(87) PCT Pub. No.: WO2019/031037
PCT Pub. Date: Feb. 14, 2019

(65) Prior Publication Data
US 2020/0183865 A1 Jun. 11, 2020

(30) Foreign Application Priority Data
Aug. 8, 2017 (JP) .............................. JP2017-153103

(51) Int. Cl.
*G06F 13/16* (2006.01)
*G06Q 10/06* (2012.01)
(Continued)

(52) U.S. Cl.
CPC ... *G06F 13/1668* (2013.01); *G06Q 10/06315* (2013.01); *G06Q 20/085* (2013.01);
(Continued)

(58) Field of Classification Search
CPC .............................. H01L 2924/00014
See application file for complete search history.

(56) References Cited

U.S. PATENT DOCUMENTS 10,121,382 B2 * 11/2018 Hisano .................... G08G 1/22
2008/0106406 A1   5/2008 Yoo et al.
(Continued)

FOREIGN PATENT DOCUMENTS

JP    2013-003816 A   1/2013
JP       5445722 B1   3/2014
(Continued)

OTHER PUBLICATIONS

International Search Report for PCT Application No. PCT/JP2018/021345, dated Jul. 17, 2018.
(Continued)

*Primary Examiner* — Henry Tsai
*Assistant Examiner* — Juanito Borromeo

(57) ABSTRACT

A first data storage unit 72 stores first data that is information related to a data providing unit to provide data. A second data storage unit 73 stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit. A combination generating unit 74 generates a combination of a data acquiring unit and a data providing unit on the basis of the condition information and the first data.

7 Claims, 13 Drawing Sheets

(51) Int. Cl.
    *G06Q 20/08*     (2012.01)
    *H04L 29/08*     (2006.01)
    *G16Y 10/25*     (2020.01)
    *G16Y 40/20*     (2020.01)

(52) U.S. Cl.
    CPC .............. *H04L 67/12* (2013.01); *G16Y 10/25* (2020.01); *G16Y 40/20* (2020.01)

(56) References Cited

U.S. PATENT DOCUMENTS

| | | | |
|---|---|---|---|
| 2010/0274774 A1* | 10/2010 | Son | G06F 16/907 707/706 |
| 2012/0101912 A1 | 4/2012 | Sen et al. | |
| 2014/0372561 A1 | 12/2014 | Hisano | |
| 2015/0245212 A1* | 8/2015 | Kawamura | H04L 67/2809 455/410 |

FOREIGN PATENT DOCUMENTS

| | | |
|---|---|---|
| JP | 2015-038744 A | 2/2015 |
| JP | 2015-062285 A | 4/2015 |
| JP | 2015-226102 A | 12/2015 |
| WO | 2014/030510 A1 | 2/2014 |
| WO | 2014/041826 A1 | 3/2014 |

OTHER PUBLICATIONS

Extended European Search Report for EP Application No. 18843517.6 dated May 13, 2020.

* cited by examiner

FIG. 2

| ITEM | VALUE |
|---|---|
| ID | 192.168.223.47 |
| TYPE | CAMERA |
| USAGE FEE | 500 YEN/MINUTE |
| POSITION | 35.681298 DEGREE OF NORTHERN LATITUDE, 139.766247 DEGREE OF EAST LONGITUDE |
| RESOLUTION | 1920 × 1080 |
| FILE FORMAT | mp4 |

FIG. 3

| ITEM | VALUE |
|---|---|
| ID | 192.168.219.47 |
| TYPE | VEHICLE DETECTION SENSOR |
| USAGE FEE | 100 YEN/MINUTE |
| POSITION | 35.681268 DEGREE OF NORTHERN LATITUDE, 139.766287 DEGREE OF EAST LONGITUDE |
| CYCLE | FIVE MINUTES |

FIG. 4

| ITEM | VALUE |
|---|---|
| ID | 11837 |
| TYPE | VIDEO MONITORING APPLICATION |
| SENSOR USAGE FEE | 500 YEN OR LESS/MINUTE |
| PRIORITY | 1 |
| TARGET AREA | 35.6812 DEGREE OF NORTHERN LATITUDE, 139.7662 DEGREE OF EAST LONGITUDE |
| USED SENSOR | CAMERA |
| RESOLUTION | 1920 × 1080 |
| FILE FORMAT | mp4 |

FIG. 5

| ITEM | VALUE |
|---|---|
| ID | 11739 |
| TYPE | PARKING SPOT MANAGEMENT APPLICATION |
| SENSOR USAGE FEE | 300 YEN OR LESS/MINUTE |
| PRIORITY | 8 |
| TARGET AREA | 35.6812 DEGREE OF NORTHERN LATITUDE, 139.7662 DEGREE OF EAST LONGITUDE |
| USED SENSOR | VEHICLE DETECTION SENSOR |
| CYCLE OF RECEIVING DATA PROVISION | 10 MINUTES OR LESS |

FIG. 7

| ITEM | VALUE |
|---|---|
| ID | 11999 |
| TYPE | VIDEO MONITORING APPLICATION |
| SENSOR USAGE FEE | 550 YEN OR LESS/MINUTE |
| PRIORITY | 3 |
| TARGET AREA | 35.6812 DEGREE OF NORTHERN LATITUDE, 139.7662 DEGREE OF EAST LONGITUDE |
| USED SENSOR | CAMERA |
| RESOLUTION | 1920×1080 |
| FILE FORMAT | mp4 |

FIG. 8

| ITEM | VALUE |
|---|---|
| ID | 15777 |
| TYPE | VIDEO MONITORING APPLICATION |
| SENSOR USAGE FEE | 600 YEN OR LESS/MINUTE |
| PRIORITY | 1 |
| TARGET AREA | 35.6812 DEGREE OF NORTHERN LATITUDE, 139.7662 DEGREE OF EAST LONGITUDE |
| USED SENSOR | CAMERA |
| RESOLUTION | 1920 × 1080 |
| FILE FORMAT | mp4 |

FIG. 10

| ITEM | VALUE |
|---|---|
| ID | 135 |
| TYPE | CORRELATION ANALYSIS |
| USAGE FEE | 500 YEN/MINUTE |

FIG. 11

| ITEM | VALUE |
|---|---|
| ID | 12237 |
| TYPE | REAL ESTATE EVALUATION APPLICATION |
| ENGINE USAGE FEE | 700 YEN OR LESS/MINUTE |
| PRIORITY | 3 |
| USED ENGINE | CORRELATION ANALYSIS |

FIG. 12

| ITEM | VALUE |
|---|---|
| ID | 12299 |
| TYPE | BEVERAGE SALES ANALYSIS APPLICATION |
| ENGINE USAGE FEE | 100 YEN OR LESS/MINUTE |
| PRIORITY | 5 |
| USED ENGINE | CORRELATION ANALYSIS |

DATA TRANSMISSION/RECEPTION CONTROL SYSTEM, METHOD AND PROGRAM

This application is a National Stage Entry of PCT/JP2018/021345 filed on Jun. 4, 2018, which claims priority from Japanese Patent Application 2017-153103 filed on Aug. 8, 2017, the contents of all of which are incorporated herein by reference, in their entirety.

TECHNICAL FIELD

The present invention relates to a data transmission/reception control system, a data transmission/reception control method, and a data transmission/reception control program for controlling data transmission/reception between a data providing unit and a data acquiring unit.

BACKGROUND ART

Recently, the Internet of things (IoT) that is a mechanism of collecting data from a sensor, analyzing the collected data, and controlling an object on the basis of the analyzed data has been spread widely. Until now, the IoT has been spread mainly in a manufacturing industry. In the IoT for the manufacturing industry, it is assumed that a data provider who provides data and a data user who uses the data are the same.

As the IoT spreads not only in the manufacturing industry but also in general industry such as agriculture, forestry, a construction industry, and a retailing industry and in an administration field such as city planning, a case where a data provider and a data user are different are started to be assumed.

Also, Patent Literature 1 describes a device that performs matching between sensor-side metadata and application-side metadata, and that controls a data flow on the basis of a result of the matching. With the device described in Patent Literature 1, it is possible to prevent leakage of data, which is acquired by a sensor, to a third party.

Patent Literature 2 describes a data structure to charge for data acquired by a sensor. Patent Literature 3 describes a system to charge for data acquired by a sensor. With the data structure described in Patent Literature 2 or the system described in Patent Literature 3, compensation can be paid for data acquired by a sensor.

Patent Literature 4 describes a module (virtual sensor) that processes and outputs data acquired by a sensor. Patent Literature 5 describes a data structure to manage the module (virtual sensor).

CITATION LIST

Patent Literature

PTL 1: Japanese Patent No. 5445722

PTL 2: Japanese Patent Application Laid-Open No. 2015-38744

PTL 3: Japanese Patent Application Laid-Open No. 2013-3816

PTL 4: Japanese Patent Application Laid-Open No. 2015-62285

PTL 5: Japanese Patent Application Laid-Open No. 2015-226102

SUMMARY OF INVENTION

Technical Problem

It can be said that value of a data providing unit that provides data (or data provided by data providing unit) varies depending on the number of data acquiring units that are to receive data provision from the data providing unit. Also, it can be said that value of a data providing unit is higher as the number of data acquiring units that are to receive data provision from the data providing unit is larger. That is, value of a data providing unit varies as the number of data acquiring units to receive data provision varies over time. Note that a data acquiring unit is an element that executes processing by using data.

In such a manner, in a case where value of a data providing unit varies, it is preferable that an appropriate combination of a data providing unit and a data acquiring unit can be generated.

Thus, the present invention is to provide a data transmission/reception control system, a data transmission/reception control method, and a data transmission/reception control program capable of generating an appropriate combination of a data providing unit and a data acquiring unit in a case where value of a data providing unit varies.

Solution to Problem

A data transmission/reception control system according to the present invention includes: a first data storage unit that stores first data that is information related to a data providing unit to provide data; a second data storage unit that stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit; and a combination generating unit that generates a combination of the data acquiring unit and the data providing unit on the basis of the condition information and the first data, wherein the combination generating unit generates the combination of the data acquiring unit and the data providing unit in a case where a variation is generated in at least one of the first data stored in the first data storage unit and the second data stored in the second data storage unit.

Also, a data transmission/reception control method according to the present invention in a computer including a first data storage unit that stores first data that is information related to a data providing unit to provide data, and a second data storage unit that stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit, the data transmission/reception control method including: by the computer, generating a combination of the data acquiring unit and the data providing unit on the basis of the condition information and the first data; wherein the computer generates the combination of the data acquiring unit and the data providing unit in a case where a variation is generated in at least one of the first data stored in the first data storage unit and the second data stored in the second data storage unit.

A data transmission/reception control program according to the present invention is a data transmission/reception control program installed in a computer including a first data storage unit that stores first data that is information related to a data providing unit to provide data, and a second data storage unit that stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit, the data transmission/reception control program causing the computer to execute combination generation processing of generating a combination of the data acquiring unit and the data providing unit on the basis of the condition information and the first data, and to execute the combination generation processing in a case where a variation is generated in at least one of the first data stored in the first data storage unit and the second data stored in the second data storage unit.

Advantageous Effects of Invention

According to the present invention, an appropriate combination of a data providing unit and a data acquiring unit can be generated in a case where value of the data providing unit varies.

BRIEF DESCRIPTION OF DRAWINGS

FIG. 2 It depicts a view for describing an example of sensor-side metadata.

FIG. 3 It depicts a view for describing an example of sensor-side metadata.

FIG. 4 It depicts a view for describing an example of application-side metadata.

FIG. 5 It depicts a view for describing an example of application-side metadata.

FIG. 7 It depicts a view for describing an example of application-side metadata.

FIG. 8 It depicts a view for describing an example of application-side metadata.

FIG. 10 It depicts a view for describing an example of engine-side metadata.

FIG. 11 It depicts a view for describing an example of application-side metadata in the third exemplary embodiment.

FIG. 12 It depicts a view for describing an example of application-side metadata in the third exemplary embodiment.

DESCRIPTION OF EMBODIMENTS

In the following, exemplary embodiments of the present invention will be described with reference to the drawings.

First Exemplary Embodiment

Figure 1:
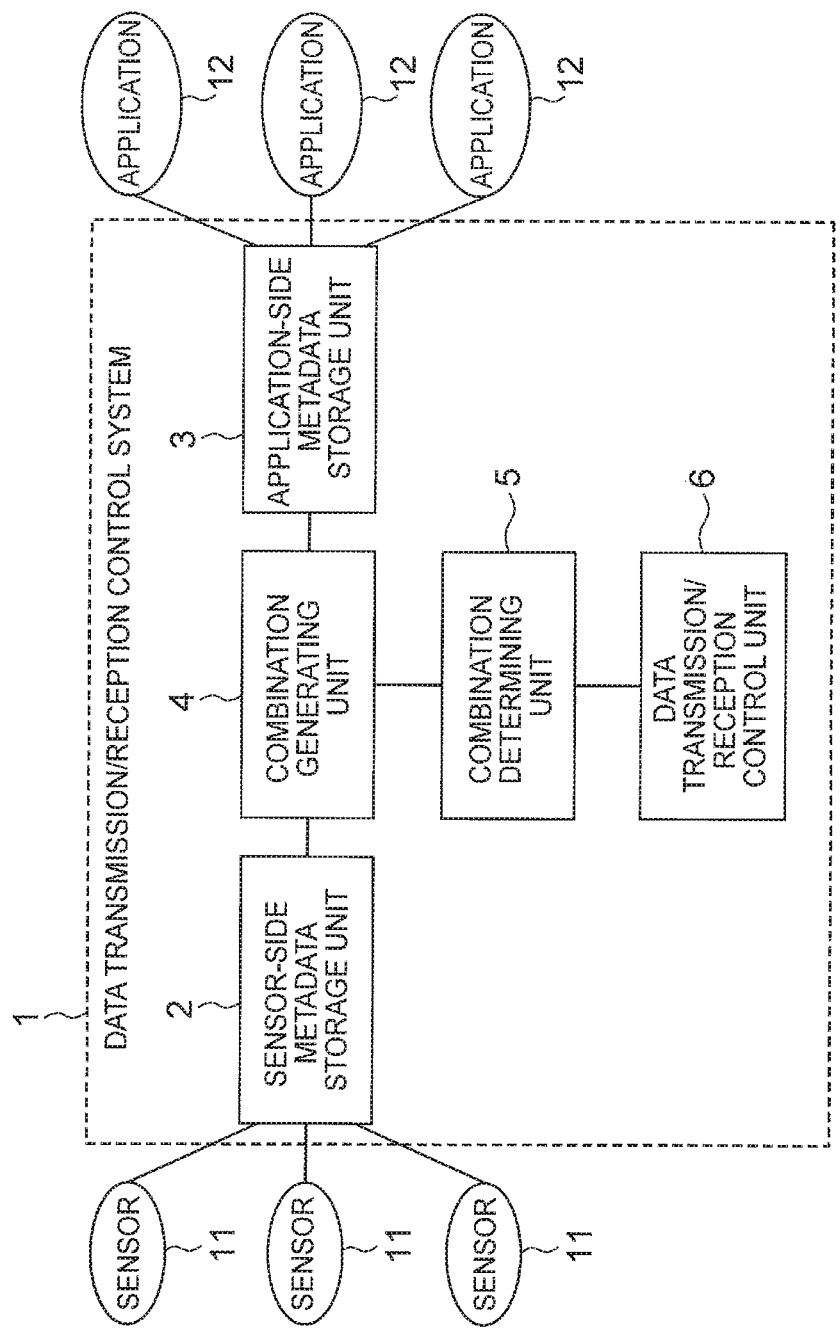
FIG. 1 It depicts a block diagram illustrating a configuration example of a data transmission/reception control system according to a first exemplary embodiment of the present invention.

FIG. 1 is a block diagram illustrating a configuration example of a data transmission/reception control system according to the first exemplary embodiment of the present invention.

A data transmission/reception control system 1 of the first exemplary embodiment includes a sensor-side metadata storage unit 2, an application-side metadata storage unit 3, a combination generating unit 4, a combination determining unit 5, and a data transmission/reception control unit 6.

The data transmission/reception control system 1 of the present exemplary embodiment controls data transmission/reception between one or a plurality of sensors 11 and one or a plurality of applications 12. An owner of the data transmission/reception control system 1 can be referred to as an intermediary. Here, data transmission/reception means provision of data from the sensors 11 to the applications 12 by communication.

Although three sensors 11 are illustrated in FIG. 1, the number of sensors is not specifically limited. Similarly, although three applications 12 are illustrated in FIG. 1, the number of applications is not specifically limited. Also, the sensors 11 do not need to be the same type of sensors, and the sensors 11 may be different type of sensors. Similarly, the applications 12 do not need to be the same type of applications, and the applications 12 may be different type of applications. Also, there may be the same type of sensors 11 and the same type of applications 12.

The sensors 11 are sensors owned by a data provider. Owners of the sensors 11 may be different.

Each sensor 11 is an example of a data providing unit that provides data. That is, the sensor 11 corresponds to a data providing unit.

The sensor 11 provides data, which is acquired by the sensor 11, as it is to a data providing destination.

Information related to the data providing unit is referred to as data providing unit-side metadata. In exemplary embodiments of the present invention, information related to a sensor 11 is referred to as sensor-side metadata. The sensor-side metadata corresponds to the data providing unit-side metadata.

The sensor-side metadata storage unit 2 stores the sensor-side metadata. More specifically, the sensor-side metadata storage unit 2 stores sensor-side metadata of a sensor 11 of a data provider who intends to provide data acquired by the sensor 11.

For example, the data provider connects the sensor 11 to the sensor-side metadata storage unit 2 and stores the sensor-side metadata of the sensor 11 into the sensor-side metadata storage unit 2. This operation indicates intention of the data provider to provide the data acquired by the sensor 11.

Also, for example, operation of deleting the sensor-side metadata of the sensor 11 which data is stored in the sensor-side metadata storage unit 2 can be said as operation indicating that the data provider loses the intention to provide the data acquired by the sensor 11. For example, in a case where connection between the sensor 11 and the sensor-side metadata storage unit 2 is disconnected, the sensor-side metadata storage unit 2 deletes the sensor-side metadata of the sensor 11. In this case, the data provider may cause the sensor-side metadata storage unit 2 to delete the sensor-side metadata of the sensor 11 by disconnecting the connection between the sensor 11 and the sensor-side metadata storage unit 2.

The sensor-side metadata storage unit 2 only needs to store sensor-side metadata of a sensor 11 of a data provider who intends to provide data acquired by the sensor 11. Operation of storing sensor-side metadata into the sensor-side metadata storage unit 2 on the basis of such intention of a data provider is not limited to the above example. Also, operation of causing the sensor-side metadata storage unit 2 to delete sensor-side metadata is not limited to the above example.

Also, examples of a sensor 11 include a camera, a microphone, a luminometer, a vehicle detection sensor, and the like. However, the sensor 11 is not limited to these examples. Note that the vehicle detection sensor is a sensor that performs laser emission and that detects whether there is a vehicle in a parking spot according to existence/non-existence of reflection of the laser, for example.

FIG. 2 and FIG. 3 are views for describing examples of sensor-side metadata.

FIG. 2 is a view illustrating an example of sensor-side metadata of a case where a sensor 11 is a camera. "Identification (ID)" is an ID of the sensor 11. A "type" indicates a type of the sensor 11, and it is indicated in the example illustrated in FIG. 2 that the sensor 11 is a camera. A "usage fee" indicates a usage fee of the sensor 11, and it is indicated in the example illustrated in FIG. 2 that the usage fee of the sensor 11 (camera) is "500 yen/minute." A "position" indicates a position of the sensor 11. In the present example, the position of the sensor 11 is indicated by latitude and longitude. "Resolution" is an example of an item provided in a case where the sensor 11 is a camera, and indicates resolution of an image acquired by the camera. A "file format" is also an example of an item provided in a case where the sensor 11 is a camera, and indicates a file format of an image acquired by the camera. The "usage fee" illustrated in FIG. 2 can be rewritten. Also, when an installation position of a camera can be changed, the "position" can be rewritten. Also, when a camera has a function of changing resolution or a file format, the "resolution" or the "file format" can be rewritten.

FIG. 3 is a view illustrating an example of sensor-side metadata of a case where a sensor 11 is a vehicle detection sensor. "ID," a "type," a "usage fee," and a "position" respectively indicate an ID of the sensor 11, a type of the sensor 11, a usage fee of the sensor 11, and a position of the sensor 11. This point is the similar to the example illustrated in FIG. 2. In the example illustrated in FIG. 3, the type of the sensor 11 is a vehicle detection sensor, and the usage fee of the sensor 11 is "100 yen/minute." A "cycle" is an example of an item provided in a case where the sensor 11 is a vehicle detection sensor, and is a cycle in which the vehicle detection sensor detects whether there is a vehicle in a parking spot. The "usage fee" illustrated in FIG. 3 can be rewritten. Also, when an installation position of the vehicle detection sensor can be changed, the "position" can be rewritten. Also, when the vehicle detection sensor has a function of changing a cycle of detecting whether there is a vehicle, the "cycle" can be rewritten.

Note that the "cycle" is preferably short to some extent. As an example, the "cycle" is preferably about five minutes. For example, it is assumed that the "cycle" is one hour. Then, for example, it is assumed that existence of a vehicle is detected at 10:00. It is assumed that the vehicle leaves the parking spot immediately after this (for example, at 10:02) and no vehicle enters the parking spot thereafter. In this case, time of next detection whether there is a vehicle is 11:00. The vehicle detection sensor outputs data indicating that there is a vehicle from 10:00 to 11:00 although there is no vehicle from 10:02 to 11:00. As a result, an application that uses the output data of the vehicle detection sensor (such as application of guiding vehicle to parking spot having no vehicle) also recognizes that there is a vehicle until 11:00, and an opportunity loss such as inability to guide a vehicle to a vacant parking spot is generated. Thus, it is preferable that a cycle of the vehicle detection sensor is about five minutes, for example. However, the cycle of about five minutes in the above description and "five minutes" illustrated in FIG. 3 are examples, and a cycle of the vehicle detection sensor is not limited to about five minutes or "five minutes."

An example of a data acquiring unit that acquires data provided from a sensor 11 and that executes processing by using the data includes an information processing device that operates according to an application (application software). What actually receives provision of data and executes processing is such an information processing device. However, in order to simplify a description, the description will be made conveniently on the assumption that an application receives provision of data and executes processing. That is, actually, each of the applications 12 illustrated in FIG. 1 is installed in an information processing device, and the information processing device executes processing according to the applications 12. However, a description will be made conveniently on the assumption that the applications 12 receive data and execute processing in the following description. Note that a plurality of applications 12 may be installed in one information processing device. Also, the applications 12 may be installed in different information processing devices.

Each of the applications 12 corresponds to a data acquiring unit.

Information that is related to a data acquiring unit and that includes a rewritable first variable value indicating a condition requested by the data acquiring unit to a data providing unit, and a rewritable second variable value to be a reference in determination of a combination of a data acquiring unit and a data providing unit to perform data transmission/reception will be described as data acquiring unit-side metadata. In exemplary embodiments of the present invention, information that is related to an application 12 and that includes a rewritable first variable value indicating a condition requested by the application 12 to a data providing unit, and a rewritable second variable value to be a reference in determination of a combination of an application 12 and a data providing unit to perform data transmission/reception will be described as application-side metadata. The application-side metadata corresponds to data acquiring unit-side metadata.

An application 12 gives a connection request to a sensor 11, which satisfies a condition requested by the application 12, by storing application-side metadata of the application 12 in the application-side metadata storage unit 3. That is, when a data user operates an application 12 and the application 12 stores application-side metadata into the application-side metadata storage unit 3 in response to the operation, it is meant that the data user wants to use data provided by a sensor 11 that satisfies a condition. Thus, for example, when application-side metadata of a certain application (referred to as P) is stored in the application-side metadata storage unit 3, it is meant that the application P gives a connection request to a sensor 11 that satisfies a requested condition.

Also, it is assumed that a data user operates an application 12 and the application 12 causes the application-side metadata storage unit 3 to delete application-side metadata of the application 12 in response to the operation. This means that the data user no longer wants to use data provided by the sensor 11 that satisfies a condition. Thus, for example, when the application-side metadata storage unit 3 deletes the application-side metadata of the application P according to a request from the application P, it is meant that the application P cancels the connection request to the sensor 11.

FIG. 4 and FIG. 5 are views for describing examples of application-side metadata.

FIG. 4 is a view illustrating an example of application-side metadata of a case where an application 12 is a video monitoring application. "ID" is an ID of the application 12. A "type" indicates a type of the application 12, and it is indicated in the example illustrated in FIG. 4 that the application 12 is a "video monitoring application."

A "sensor usage fee" is a usage fee of a sensor 11 of when the application 12 uses the sensor 11 (that is, receives data provision from sensor 11). A value of the "sensor usage fee" can be rewritten. Note that that the value being rewritable means that the value may vary over time. The "sensor usage fee" is one of conditions requested by the application 12.

"Priority" is a variable to be a reference, in a case where a plurality of applications 12 is combined with one sensor 11, in determination of an application 12 that performs data transmission/reception with a sensor 11. Priority becomes higher as a value of the priority becomes smaller. For example, a value of priority of a video monitoring application used by police is set to "1," a value of priority of a video monitoring application used by a security company is set to "2," and a value of priority of a video monitoring application used by a railroad company is set to "3." A value of the "priority" can be also rewritten. For example, a value of priority of a video monitoring application used by a railroad company may be normally set to "1" and may be rewritten to "3" in a case of emergency. Similarly, a value of priority of a video monitoring application used by police may be usually set to "3" and may be rewritten to "1" in a case of emergency.

A "target area" is one of the conditions requested by the application 12, and a range is indicated by latitude and longitude in the present example. For example, as illustrated in FIG. 2 or FIG. 3, it is assumed that latitude and longitude are set to the sixth decimal place as a "position" in sensor-side metadata. On the other hand, it is assumed that latitude and longitude are set as a "target area" with digits smaller than six decimal places in application-side metadata. In such a manner, a range can be indicated with the latitude and the longitude. For example, in the example illustrated in FIG. 4, the latitude and the longitude are set to the fourth decimal place as a "target area." In this case, it is meant that a range of 35.681200 to 35.681299 degrees of northern latitude and 139.766200 to 139.766299 degrees of east longitude is indicated in the example illustrated in FIG. 4. A value of the "target area" can be also rewritten. Note that a way of indicating a range is not limited to the example illustrated in FIG. 4, and a range may be indicated by designation of a center position and a radius, for example.

A "used sensor" is a variable indicating a type of a sensor 11 to be used by the application 12. The "used sensor" is also one of the conditions requested by the application 12. A value of the "used sensor" can be also rewritten. However, in a case where a function of the application 12 is limited, there may be a case where a value of the "used sensor" is not rewritten. For example, in a monitoring application having a function of monitoring sound and a function of monitoring video, a value of the "used sensor" may be rewritten from a "microphone" to a "camera," or rewriting in the opposite way may be performed. Also, in a video monitoring application having only a function of monitoring video, a value of the "used sensor" is always set to a "camera" even when rewriting is possible.

"Resolution" and a "file format" are variables provided in a case where the "used sensor" is a camera. The "resolution" indicates a lower limit of resolution requested to the camera. The "file format" indicates a file format of an image requested to the camera. The "resolution" and the "file format" can be also rewritten. Also, the "resolution" and the "file format" are also the conditions requested by the application 12.

In the example illustrated in FIG. 4, the "sensor usage fee," the "target area," the "used sensor," the "resolution," and the "file format" correspond to the first variable described above. Also, the "priority" corresponds to the second variable described above.

FIG. 5 is a view illustrating an example of application-side metadata of a case where an application 12 is a parking spot management application. "ID," a "type," a "sensor usage fee," "priority," a "target area," and a "used sensor" illustrated in FIG. 5 are similar to those items illustrated in FIG. 4 and a description thereof is omitted.

In a case where the application 12 is a parking spot management application, a "cycle of receiving data provision" is a cycle in which the parking spot management application receives provision of data (data indicating whether there is vehicle in parking spot) from a vehicle detection sensor. The "cycle of receiving data provision" may be used as a condition requested by the application 12 to a sensor 11. When a cycle in which the application receives data provision is shorter than a cycle in which the vehicle detection sensor detects whether there is a vehicle in a parking spot (see FIG. 3), the application receives the same data redundantly and there is no point. Thus, the "cycle of receiving data provision" can be used as a condition requested by the application 12 to the sensor 11. However, a range of "10 minutes or less" is illustrated and both one minute and nine minutes correspond to "10 minutes or less" in the example illustrated in FIG. 5. Thus, in a case where the "cycle of receiving data provision" is used as a condition, one numerical value is described instead of a range such as "10 minutes or less." When the application 12 has a function of changing the cycle of receiving data provision from the sensor 11, the "cycle of receiving data provision" can be rewritten.

In the example illustrated in FIG. 5, the "sensor usage fee," the "target area," and the "used sensor" correspond to the first variable described above. Also, the "priority" corresponds to the second variable described above.

The combination generating unit 4 collates the sensor-side metadata stored in the sensor-side metadata storage unit 2 with the application-side metadata stored in the application-side metadata storage unit 3, and generates a plurality of combinations of an application 12 and sensors 11 that satisfy a condition requested by the application 12. The combination generating unit 4 may generate all combinations of an application 12 and sensors 11 that satisfy a condition requested by the application 12.

More specifically, the combination generating unit 4 generates all combinations of an application 12 and sensors 11 that satisfy a condition requested by the application 12 by collating a first variable (variable indicating condition requested by application 12 to sensor 11) in application-side metadata stored in the application-side metadata storage unit 3 with contents of sensor-side metadata stored in the sensor-side metadata storage unit 2.

For example, it is assumed that the sensor-side metadata illustrated in FIG. 2 and the sensor-side metadata illustrated in FIG. 3 are stored in the sensor-side metadata storage unit 2. Also, it is assumed that the application-side metadata illustrated in FIG. 4 and the application-side metadata illustrated in FIG. 5 are stored in the application-side metadata storage unit 3.

For example, the combination generating unit 4 generates a combination of an application "11837 (see FIG. 4)" and a sensor "192.168.223.47 (see FIG. 2)" by determining that contents of the sensor-side metadata illustrated in FIG. 2 satisfy all of the conditions described in the application-side metadata illustrated in FIG. 4 ("sensor usage fee," "target area," "used sensor," "resolution," and "file format"). Note that when there is a different sensor 11 that satisfies the conditions requested by the application "11837," the combination generating unit 4 also generates a combination of the application "11837" and the sensor 11.

Also, for example, the combination generating unit 4 generates a combination of an application "11739 (see FIG. 5)" and a sensor "192.168.219.47 (see FIG. 3)" by determining that contents of the sensor-side metadata illustrated in FIG. 3 satisfy all of the conditions described in the application-side metadata illustrated in FIG. 5 ("sensor usage fee," "target area," and "used sensor"). Note that when there is a different sensor 11 that satisfies the conditions requested by the application "11739," the combination generating unit 4 also generates a combination of the application "11739" and the sensor 11.

Also, a value of the "used sensor" is a "camera" in the example illustrated in FIG. 4, and a value of a "type" is a "vehicle detection sensor" in the example illustrated in FIG. 3. The "camera" and the "vehicle detection sensor" do not match. Thus, a combination of the application "11837 (see FIG. 4)" and the sensor "192.168.219.47 (see FIG. 3)" is not generated. Similarly, a combination of the application "11739 (see FIG. 5)" and the sensor "192.168.223.47 (see FIG. 2)" is not generated.

The combination generating unit 4 generates all combinations of an application 12 and sensors 11 that satisfy a condition requested by the application 12 as described above in a case where a variation is generated in at least one of the sensor-side metadata stored in the sensor-side metadata storage unit 2 and the application-side metadata stored in the application-side metadata storage unit 3.

Here, modes of the variation include the following modes.

(1) A part or whole of contents of at least one piece of sensor-side metadata in the sensor-side metadata already stored in the sensor-side metadata storage unit 2 is rewritten.

(2) A part or whole of contents of at least one piece of application-side metadata in the application-side metadata already stored in the application-side metadata storage unit 3 is rewritten.

(3) At least one piece of sensor-side metadata in the sensor-side metadata already stored in the sensor-side metadata storage unit 2 is deleted or new sensor-side metadata is additionally stored into the sensor-side metadata storage unit 2.

(4) At least one piece of application-side metadata in the application-side metadata already stored in the application-side metadata storage unit 3 is deleted or new application-side metadata is stored into the application-side metadata storage unit 3.

Each time any of (1) to (4) described above is detected, the combination generating unit 4 executes processing of generating all combinations of an application 12 and sensors 11 that satisfy a condition requested by the application 12.

Note that the combination generating unit 4 may periodically execute the processing of generating all combinations of an application 12 and sensors 11 that satisfy a condition requested by the application 12.

When the combination generating unit 4 generates combinations of an application 12 and sensors 11, the combination determining unit 5 determines a combination of a sensor 11 and the application 12 to perform data transmission/reception from the combinations generated by the combination generating unit 4. Here, in the first exemplary embodiment, the combination determining unit 5 uses, as a reference in determination of the combination of a sensor 11 and the application 12 to perform data transmission/reception, priority included in application-side metadata of the application 12 included in the combination generated by the combination generating unit 4.

When there is one application 12 combined with a sensor 11, the combination determining unit 5 determines the combination of the sensor 11 and the application 12 as the combination of the sensor 11 and the application 12 to perform data transmission/reception.

Also, in a case where there is a plurality of applications 12 combined with one sensor 11, the combination determining unit 5 determines, as a combination of the sensor 11 and an application 12 to perform data transmission/reception, a combination of an application 12 having the highest priority among the applications 12 and the sensor 11.

For example, it is assumed that a combination of the sensor "192.168.223.47 (see FIG. 2)" and a different application 12 having priority "2" is generated in addition to the combination of the sensor "192.168.223.47 (see FIG. 2)" and the application "11837 (see FIG. 4)." Since priority of the application "11837 (see FIG. 4)" is "1" (see FIG. 4), the combination determining unit 5 determines the combination of the sensor "192.168.223.47 (see FIG. 2)" and the application "11837 (see FIG. 4)" as the combination of the sensor 11 and the application 12 to perform data transmission/reception.

Note that in a case where there is a plurality of applications 12 having the highest "priority," the combination determining unit 5 specifies an application 12 application-side metadata of which is stored the earliest, and determines a combination of the application 12 and the sensor 11, for example.

For example, the combination determining unit 5 determines a combination of a sensor 11 and an application 12 to perform data transmission/reception by specifying an application 12 having the highest priority for each sensor 11 included in the combinations generated by the combination generating unit 4.

Also, it is assumed that a sensor 11 is a sensor that can provide data to a plurality of (such as two) applications 12. In this case, the combination determining unit 5 may specify two applications 12 to receive data provision from the sensor 11 on the basis of priority. Then, the combination determining unit 5 may determine, as a combination of a sensor 11 and an application 12 to perform data transmission/reception, each of a combination of the sensor 11 and one application 12 to be a data providing destination and a combination of the sensor 11 and the other application 12 to be a data providing destination. This point is in a similar manner in the other exemplary embodiments described later.

Also, in a case where there is a plurality of sensors 11 that satisfies a condition requested by one application 12, the combination generating unit 4 generates a combination of the application 12 and each of the plurality of sensors 11. As a result, the combination determining unit 5 may determine a combination of each of the plurality of sensors 11 and the application 12 as a combination of a sensor 11 and the application 12 to perform data transmission/reception. In such a manner, the combination determining unit 5 may determine a plurality of combinations having the common application 12. Alternatively, the combination determining unit 5 may not permit existence of a plurality of combinations having the common application 12. In this case, for example, the combination determining unit 5 randomly selects one combination from the combination of the application 12 and the plurality of sensors 11 and subsequently determines, in the above manner, a combination of a sensor 11 and the application 12 to perform data transmission/reception. This point is in a similar manner in the other exemplary embodiments described later.

With respect to each combination of a sensor 11 and an application 12 to perform data transmission/reception which combination is determined by the combination determining unit 5, the data transmission/reception control unit 6 makes the sensor 11 and the application 12 to perform data transmission/reception.

For example, with respect to each of the combinations determined by the combination determining unit 5, the data transmission/reception control unit 6 transmits, to a sensor 11 included in the combination, destination information of the application 12 to be a data providing destination. The destination information is, for example, an Internet protocol (IP) address of an information processing device in which the application 12 is installed, and a port number corresponding to the application 12. Here, the destination information of a case where the sensor 11 and the application 12 transmits/receives data via the Internet is exemplified. The data transmission/reception control unit 6 transmits, to the sensor 11, destination information corresponding to a communication form between the sensor 11 and the application 12.

Note that the destination information of the application 12, or address information of the sensor 11 which address information is used in transmission of the destination information to the sensor 11 is, for example, previously registered in the data transmission/reception control unit 6 by a data provider or a data user who intends to use the data transmission/reception control system 1 of the present invention.

The sensor 11 that receives the destination information from the data transmission/reception control unit 6 establishes communication with the application 12 by using the destination information, and transmits (provide) data acquired by the sensor 11 to the application 12.

The sensor-side metadata storage unit 2 and the application-side metadata storage unit 3 are realized, for example, by a storage device provided in a computer, and a central processing unit (CPU) of the computer which unit operates according to a data transmission/reception control program. The combination generating unit 4, the combination determining unit 5, and the data transmission/reception control unit 6 are realized, for example, by the CPU of the computer which unit operates according to the data transmission/reception control program.

Figure 6:
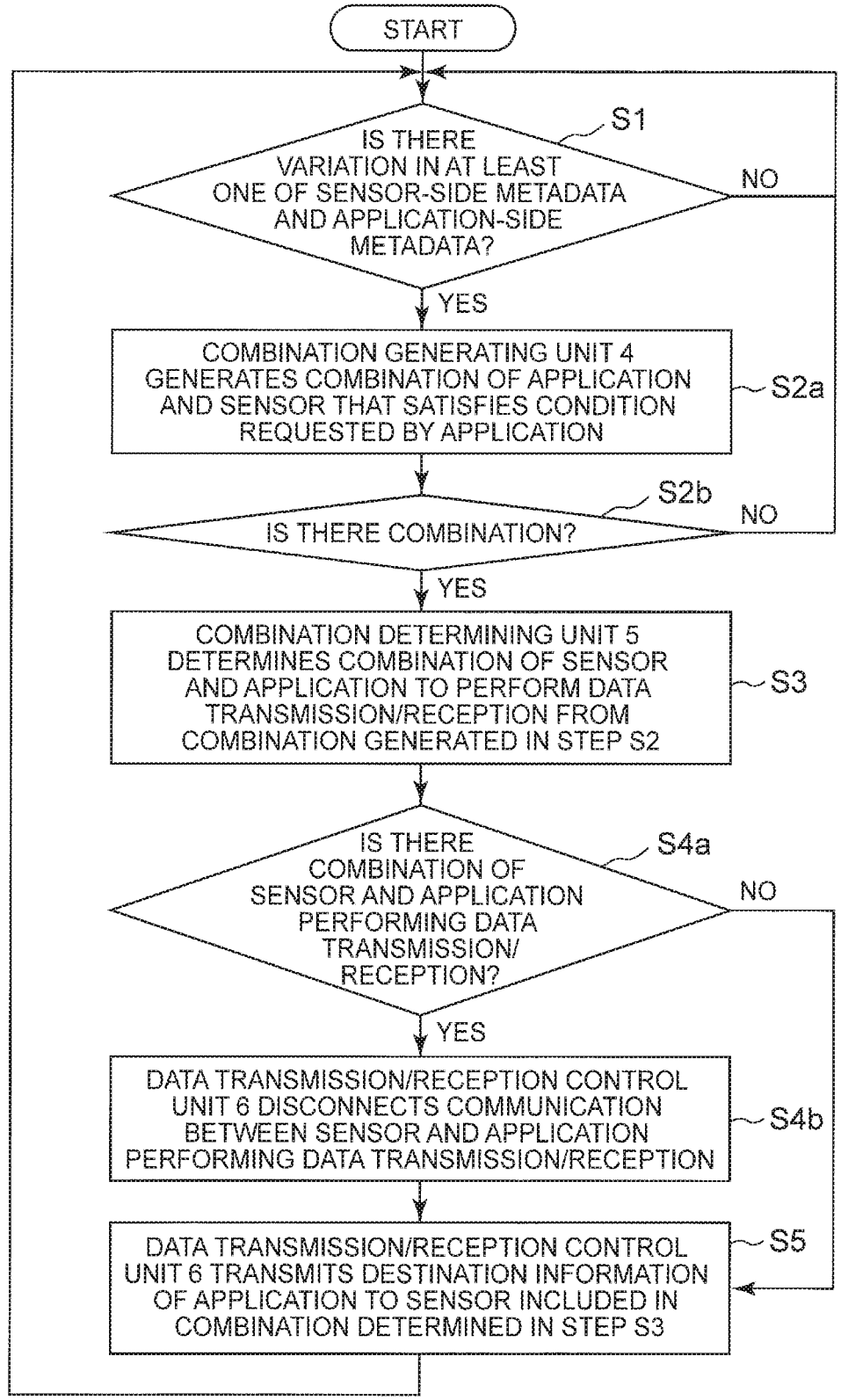
FIG. 6 It depicts a flowchart illustrating an example of processing progress of the first exemplary embodiment.

Next, a situation in which applications 12 to which data is provided by one sensor 11 are switched will be described with reference to a flowchart illustrating an example of processing progress of the first exemplary embodiment. FIG. 6 is a flowchart illustrating an example of the processing progress of the first exemplary embodiment. Note that a detailed description of an already-described item is omitted.

Here, in order to simplify the description, first, it is assumed that the sensor-side metadata illustrated in FIG. 2 is stored in the sensor-side metadata storage unit 2. Also, it is assumed that application-side metadata is not stored yet in the application-side metadata storage unit 3. Thus, a sensor 11 and an application 12 performing data transmission/reception do not exist yet.

The combination generating unit 4 monitors whether a variation is generated in at least one of sensor-side metadata stored in the sensor-side metadata storage unit 2 and application-side metadata stored in the application-side metadata storage unit 3 (Step S1). When there is no variation (No in Step S1), the combination generating unit 4 repeats the operation in Step S1.

When there is a variation (Yes in Step S1), the combination generating unit 4 generates a combination of an application 12 and a sensor 11 that satisfies a condition requested by the application 12 (Step S2a).

Then, the combination generating unit 4 determines whether a combination of an application 12 and a sensor 11 that satisfies a condition requested by the application 12 is acquired (Step S2b). In a case where no combination is acquired (No in Step S2b), a transition to Step S1 is performed. In a case where a combination is acquired (Yes in Step S2b), a transition to Step S3 is performed.

Here, it is assumed that application-side metadata illustrated in FIG. 7 is newly stored in the application-side metadata storage unit 3 in response to a request from the application 12. Then, since a variation is generated, the combination generating unit 4 executes Step S2a.

Here, contents of the sensor-side metadata illustrated in FIG. 2 satisfy a condition indicated by a first variable value of the application-side metadata illustrated in FIG. 7. Thus, the combination generating unit 4 generates a combination of a sensor "192.168.223.47 (see FIG. 2)" and an application "11999 (see FIG. 7)." In the present example, since the combination of the sensor "192.168.223.47 (see FIG. 2)" and the application "11999 (see FIG. 7)" is acquired (Yes in Step S2b), a transition to Step S3 is performed.

In Step S3, the combination determining unit 5 determines a combination of a sensor 11 and an application 12 to perform data transmission/reception from the combination generated in Step S2a.

In Step S2a, the combination of the sensor "192.168.223.47 (see FIG. 2)" and the application "11999 (see FIG. 7)" is generated. Also, there is no other application 12 combined with the sensor "192.168.223.47 (see FIG. 2)." Thus, the combination determining unit 5 determines the combination of the sensor "192.168.223.47 (see FIG. 2)" and the application "11999 (see FIG. 7)" as a combination of the sensor 11 and the application 12 to perform data transmission/reception.

After Step S3, the data transmission/reception control unit 6 determines whether there is a combination of a sensor 11 and an application 12 that are performing data transmission/reception (Step S4a). Here, the combination of the sensor 11 and the application 12 that are performing data transmission/reception is a combination of a sensor 11 that provides data by communication and an application 12 that receives the data.

When there is a combination of a sensor 11 and an application 12 that are performing data transmission/reception (Yes in Step S4*a*), the data transmission/reception control unit 6 disconnects the communication between the sensor 11 and the application 12 (Step S4*b*). After Step S4*b*, a transition to Step S5 is performed. Note that in a case where the sensor 11 and an application 11 included in the combination determined in the most recent Step S3 are performing communication, the data transmission/reception control unit 6 does not need to disconnect the communication in Step S4*b*.

Also, when there is no combination of a sensor 11 and an application 12 that are performing data transmission/reception (No in Step S4*a*), a transition to Step S5 is performed without execution of Step S4*b*.

At this time point in the present example, there is no combination of a sensor 11 and an application 12 that are performing data transmission/reception (No in Step S4*a*). Thus, a transition to Step S5 is performed without execution of Step S4*b*.

In Step S5, the data transmission/reception control unit 6 transmits destination information of the application 12 to the sensor 11 included in the combination determined in Step S3 (Step S5). In the present example, the data transmission/reception control unit 6 transmits destination information of the application "11999 (see FIG. 7)" to the sensor "192.168.223.47 (see FIG. 2)."

As a result, the sensor "192.168.223.47 (see FIG. 2)" uses the destination information of the application "11999 (see FIG. 7)" and establishes communication with the application "11999," and the sensor "192.168.223.47" provides data to the application "11999."

After Step S5, the processing in and after Step S1 is repeated.

Next, it is assumed that the application-side metadata storage unit 3 newly stores the application-side metadata illustrated in FIG. 4 in response to a request from a different application 12. Then, since a variation (addition of new data) is generated in the stored application-side metadata, the combination generating unit 4 executes Step S2*a*.

As described above, contents of the sensor-side metadata illustrated in FIG. 2 satisfy a condition indicated by the first variable value of the application-side metadata illustrated in FIG. 7. Also, the contents of the sensor-side metadata illustrated in FIG. 2 satisfy a condition indicated by a first variable value of the application-side metadata illustrated in FIG. 4.

Thus, the combination generating unit 4 generates a combination of the sensor "192.168.223.47 (see FIG. 2)" and the application "11999 (see FIG. 7)," and a combination of the sensor "192.168.223.47 (see FIG. 2)" and the application "11837 (See FIG. 4)" (Step S2*a*). In the present example, since two combinations are acquired in Step S2*a* (Yes in Step S2*b*), a transition to Step S3 is performed.

In Step S3, the combination determining unit 5 determines a combination of a sensor 11 and an application 12 to perform data transmission/reception from the combinations generated in Step S2*a*.

Here, the sensor 11 is common in the two combinations generated in Step S2*a*. That is, there are two applications 12 combined with one sensor 11. Here, priority of the application "11837" is "1" (see FIG. 4) and priority of the application "11999" is "3" (see FIG. 7). Thus, an application 12 having the highest priority in the two applications 12 is the application "11837." Thus, the combination determining unit 5 determines, as a combination of a sensor 11 and an application 12 to perform data transmission/reception, the combination of the sensor "192.168.223.47 (see FIG. 2)" and the application "11837 (see FIG. 4)" in the two combinations generated in Step S2*a*.

Next, the data transmission/reception control unit 6 determines whether there is a combination of a sensor 11 and an application 12 that are performing data transmission/reception (Step S4*a*). Here, the data transmission/reception control unit 6 determines that there is the combination of the sensor "192.168.223.47 (see FIG. 2)" and the application "11999 (see FIG. 7)" as a combination of a sensor 11 and an application 12 that are performing data transmission/reception (Yes in Step S4*a*). Then, the data transmission/reception control unit 6 disconnects the communication between the sensor "192.168.223.47 (see FIG. 2)" and the application "11999 (see FIG. 7)" (Step S4*b*).

Next, the data transmission/reception control unit 6 transmits destination information of the application 12 to the sensor 11 included in the combination determined in Step S3 (Step S5). Here, the data transmission/reception control unit 6 transmits destination information of the application "11837 (see FIG. 4)" to the sensor "192.168.223.47 (see FIG. 2)."

As a result, the sensor "192.168.223.47 (see FIG. 2)" establishes communication with the application "11837 (see FIG. 4)" by using the destination information of the application "11837," and the sensor "192.168.223.47" provides data to the application "11837."

Since the application-side metadata illustrated in FIG. 4 is stored into the application-side metadata storage unit 3, it can be said that the two applications 12 are in a state of giving a connection request to one sensor 11 simultaneously. Here, the application "11837 (see FIG. 4)" has higher priority than the application "11999 (see FIG. 7)." Thus, a data providing destination of the sensor "192.168.223.47" is switched from the application "11999" to the application "11837" by the operations in Step S2*a* to S5 described above.

Subsequently, for example, in a case where the priority of the application "11837 (see FIG. 4)" is rewritten, for example, to "4," Step S2*a* to S5 is executed again. Also, when the contents of the sensor-side metadata are rewritten or a condition requested by the application 12 to the sensor 11 (first variable value included in application-side metadata) is rewritten, the processing in Step S2*a* to S5 is executed again. Then, by execution of the processing in Step S2*a* to S5, an appropriate combination of a sensor 11 and an application 12 to perform data transmission/reception is determined according to a variation in priority or a condition requested by the application 12 to the sensor 11, and data transmission/reception between the sensor 11 and the application 12 is realized.

In a manner of the above example, it can be said that value of the sensor 11 varies as the number of applications 12 that give a connection request to the sensor 11 varies. According to the first exemplary embodiment, the combination generating unit 4 generates a combination of an application 12 and a sensor 11 that satisfies a condition requested by the application 12. That is, the combination generating unit 4 can generate an appropriate combination of a data providing unit and a data acquiring unit in a case where value of the data providing unit varies. Then, the combination determining unit 5 determines a combination of a sensor 11 and an application 12 to perform data transmission/reception on the basis of priority of the application 12, and the data transmission/reception control unit 6 transmits destination information of the application 12 to the sensor 11 included in the combination. Thus, under a situation in which value of a sensor 11 varies as described above, a combination of a sensor 11 and the application 12 to perform data transmission/reception is determined on the basis of priority, and data transmission/reception between the sensor 11 and the application 12 can be realized.

Second Exemplary Embodiment

Since a data transmission/reception control system of the second exemplary embodiment of the present invention can be also expressed by the block diagram illustrated in FIG. 1 similarly to the data transmission/reception control system of the first exemplary embodiment, the second exemplary embodiment will be described with reference to FIG. 1. A description of an item similar to that of the first exemplary embodiment will be arbitrarily omitted.

Sensor-side metadata and application-side metadata in the second exemplary embodiment may be similar to the sensor-side metadata and the application-side metadata (see, for example, FIG. 2 to FIG. 5) in the first exemplary embodiment.

However, in the second exemplary embodiment, when determining a combination of a sensor 11 and an application 12 to perform data transmission/reception, a combination determining unit 5 determines a combination of a sensor 11 and an application 12 on the basis of a usage fee of the sensor 11 that a data user pays to a data provider. Thus, in the second exemplary embodiment, application-side metadata includes a value of a "sensor usage fee."

In the second exemplary embodiment, the "sensor usage fee" in the application-side metadata also corresponds to a first variable (variable indicating condition requested by application 12 to sensor 11), and also corresponds to a second variable (variable to be reference in determination of combination of sensor 11 and application 12 to perform data transmission/reception).

In the second exemplary embodiment, the "sensor usage fee" is also used as a condition. Thus, for example, a case where a description is made in such a manner as to indicate a range of a price such as "600 yen or less/minute" will be described as an example. Also, in the following description, the description will be made on the assumption that the price at an upper limit of the range ("600 yen/minute" in above example) is payed when a data user actually uses a sensor 11 and pays a usage fee of the sensor 11 to a data provider. As a result, the data provider may acquire a higher usage fee than a value of a "usage fee" described in sensor-side metadata. For example, there is a case where a data provider who sets a usage fee of a sensor 11 as "500 yen/minute" acquires a usage fee equal to or higher than that from a data user.

Also, in the second exemplary embodiment, the application-side metadata may or may not include a value of "priority."

A sensor-side metadata storage unit 2, an application-side metadata storage unit 3, a combination generating unit 4, and a data transmission/reception control unit 6 in the second exemplary embodiment are similar to the sensor-side metadata storage unit 2, the application-side metadata storage unit 3, the combination generating unit 4, and the data transmission/reception control unit 6 in the first exemplary embodiment, and a description thereof is omitted.

When the combination generating unit 4 generates a combination of an application 12 and a sensor 11, the combination determining unit 5 in the second exemplary embodiment determines a combination of a sensor 11 and an application 12 to perform data transmission/reception from the generated combination. This point is similar to that of the first exemplary embodiment. However, in the second exemplary embodiment, as a reference in determination of a combination of a sensor 11 and an application 12 to perform data transmission/reception, the combination determining unit 5 uses a "sensor usage fee" included in application-side metadata of an application 12 included in the combination generated by the combination generating unit 4.

When there is one application 12 combined with a sensor 11, the combination determining unit 5 determines the combination of the sensor 11 and the application 12 as the combination of the sensor 11 and the application 12 to perform data transmission/reception.

Also, in a case where there is a plurality of applications 12 combined with one sensor 11, the combination determining unit 5 determines, as a combination of a sensor 11 and an application 12 to perform data transmission/reception, a combination of an application 12 having the highest "sensor usage fee" among the applications 12 and the sensor 11.

For example, it is assumed that a combination of a sensor "192.168.223.47 (see FIG. 2)" and a different application (referred to as application B) having a "sensor usage fee" being "600 yen or less/minute" is generated in addition to a combination of the sensor "192.168.223.47 (see FIG. 2)" and an application "11837 (see FIG. 4)." Since the "sensor usage fee" of the application "11837 (see FIG. 4)" is "500 yen or less/minute" (see FIG. 4), the combination determining unit 5 determines the combination of the sensor "192.168.223.47 (see FIG. 2) and the application B as a combination of a sensor 11 and an application 12 to perform data transmission/reception.

Note that in a case where there is a plurality of applications 12 having the highest "sensor usage fee," the combination determining unit 5 specifies an application 12 application-side metadata of which is stored the earliest, and determines a combination of the application 12 and the sensor 11, for example. Also, for example, the combination determining unit 5 may specify an application 12 having the highest "priority" among the plurality of applications 12 having the highest "sensor usage fee" and determine a combination of the application 12 and the sensor 11.

For example, the combination determining unit 5 determines a combination of a sensor 11 and an application 12 to perform data transmission/reception by specifying an application 12 having the highest "sensor usage fee" with respect to each sensor 11 included in the combination generated by the combination generating unit 4.

A flowchart illustrating processing progress of the second exemplary embodiment can also be illustrated in a manner of FIG. 6. In the following, a situation in which applications 12 to which data is provided by one sensor 11 are switched will be described with reference to the flowchart illustrated in FIG. 6. Note that a detailed description of an already-described item is omitted.

Here, in order to simplify the description, first, it is assumed that the sensor-side metadata illustrated in FIG. 2 is stored in the sensor-side metadata storage unit 2. Also, it is assumed that application-side metadata is not stored yet in the application-side metadata storage unit 3. Thus, a sensor 11 and an application 12 performing data transmission/reception do not exist yet.

The combination generating unit 4 monitors whether a variation is generated in at least one of sensor-side metadata stored in the sensor-side metadata storage unit 2 and application-side metadata stored in the application-side metadata storage unit 3 (Step S1). When there is no variation (No in Step S1), the combination generating unit 4 repeats the operation in Step S1.

When there is a variation (Yes in Step S1), the combination generating unit 4 generates a combination of an application 12 and a sensor 11 that satisfies a condition requested by the application 12 (Step S2a).

Then, the combination generating unit 4 determines whether a combination of an application 12 and a sensor 11 that satisfies a condition requested by the application 12 is acquired (Step S2b). In a case where no combination is acquired (No in Step S2b), a transition to Step S1 is performed. In a case where a combination is acquired (Yes in Step S2b), a transition to Step S3 is performed.

Here, it is assumed that application-side metadata illustrated in FIG. 4 is newly stored in the application-side metadata storage unit 3 in response to a request from the application 12. Then, since a variation is generated, the combination generating unit 4 executes Step S2a.

Here, contents of the sensor-side metadata illustrated in FIG. 2 satisfy a condition indicated by a first variable value of the application-side metadata illustrated in FIG. 4. Thus, the combination generating unit 4 generates a combination of a sensor "192.168.223.47 (see FIG. 2)" and an application "11837 (see FIG. 4)." In the present example, since the combination of the sensor "192.168.223.47 (see FIG. 2)" and the application "11837 (see FIG. 4)" is acquired (Yes in Step S2b), a transition to Step S3 is performed.

In Step S3, the combination determining unit 5 determines a combination of a sensor 11 and an application 12 to perform data transmission/reception from the combination generated in Step S2a.

In Step S2a, the combination of the sensor "192.168.223.47 (see FIG. 2)" and the application "11837 (see FIG. 4)" is generated. Also, there is no other application 12 combined with the sensor "192.168.223.47 (see FIG. 2)." Thus, the combination determining unit 5 determines a combination of the sensor "192.168.223.47 (see FIG. 2)" and the application "11837 (see FIG. 4)" as a combination of a sensor 11 and an application 12 to perform data transmission/reception.

After Step S3, the data transmission/reception control unit 6 determines whether there is a combination of a sensor 11 and an application 12 that are performing data transmission/reception (Step S4a). As already described, the combination of the sensor 11 and the application 12 that are performing data transmission/reception is a combination of a sensor 11 that provides data by communication and an application 12 that receives the data.

When there is a combination of a sensor 11 and an application 12 that are performing data transmission/reception (Yes in Step S4a), the data transmission/reception control unit 6 disconnects the communication between the sensor 11 and the application 12 (Step S4b). After Step S4b, a transition to Step S5 is performed. Note that in a case where the sensor 11 and an application 11 included in the combination determined in the most recent Step S3 are performing communication, the data transmission/reception control unit 6 does not need to disconnect the communication in Step S4b.

Also, when there is no combination of a sensor 11 and an application 12 that are performing data transmission/reception (No in Step S4a), a transition to Step S5 is performed without execution of Step S4b.

At this time point in the present example, there is no combination of a sensor 11 and an application 12 that are performing data transmission/reception (No in Step S4a). Thus, a transition to Step S5 is performed without execution of Step S4b.

In Step S5, the data transmission/reception control unit 6 transmits destination information of the application 12 to the sensor 11 included in the combination determined in Step S3 (Step S5). In the present example, the data transmission/reception control unit 6 transmits destination information of the application "11837 (see FIG. 4)" to the sensor "192.168.223.47 (see FIG. 2)."

As a result, the sensor "192.168.223.47 (see FIG. 2)" establishes communication with the application "11837 (see FIG. 4)" by using the destination information of the application "11837," and the sensor "192.168.223.47" provides data to the application "11837."

After Step S5, the processing in and after Step S1 is repeated.

Next, it is assumed that the application-side metadata storage unit 3 newly stores the application-side metadata illustrated in FIG. 8 in response to a request from a different application 12. Then, since a variation (addition of new data) is generated in the stored application-side metadata, the combination generating unit 4 executes Step S2a.

As described above, contents of the sensor-side metadata illustrated in FIG. 2 satisfy a condition indicated by the first variable value of the application-side metadata illustrated in FIG. 4. Also, the contents of the sensor-side metadata illustrated in FIG. 2 satisfy a condition indicated by the first variable value of the application-side metadata illustrated in FIG. 8.

Thus, the combination generating unit 4 generates a combination of the sensor "192.168.223.47 (see FIG. 2)" and the application "11837 (see FIG. 4)," and a combination of the sensor "192.168.223.47 (see FIG. 2)" and the application "15777 (See FIG. 8)" (Step S2a). In the present example, since two combinations are acquired in Step S2a (Yes in Step S2b), a transition to Step S3 is performed.

In Step S3, the combination determining unit 5 determines a combination of a sensor 11 and an application 12 to perform data transmission/reception from the combination generated in Step S2a.

Here, the sensor 11 is common in the two combinations generated in Step S2a. That is, there are two applications 12 combined with one sensor 11. An application 12 having the highest "sensor usage fee" in the two applications 12 is the application "15777." Thus, the combination determining unit 5 determines, as a combination of a sensor 11 and an application 12 to perform data transmission/reception, a combination of the sensor "192.168.223.47 (see FIG. 2)" and the application "15777 (see FIG. 8)" in the two combinations generated in Step S2a.

Next, the data transmission/reception control unit 6 determines whether there is a combination of a sensor 11 and an application 12 that are performing data transmission/reception (Step S4a). Here, the data transmission/reception control unit 6 determines that there is the combination of the sensor "192.168.223.47 (see FIG. 2)" and the application "11837 (see FIG. 4)" as a combination of a sensor 11 and an application 12 that are performing data transmission/reception (Yes in Step S4a). Then, the data transmission/reception control unit 6 disconnects the communication between the sensor "192.168.223.47 (see FIG. 2)" and the application "11837 (see FIG. 4)" (Step S4b).

Next, the data transmission/reception control unit 6 transmits destination information of the application 12 to the sensor 11 included in the combination determined in Step S3 (Step S5). Here, the data transmission/reception control unit 6 transmits destination information of the application "15777 (see FIG. 8)" to the sensor "192.168.223.47 (see FIG. 2)."

As a result, the sensor "192.168.223.47 (see FIG. 2)" establishes communication with the application "15777" by using the destination information of the application "15777 (see FIG. 8)," and the sensor "192.168.223.47" provides data to the application "15777."

Since the application-side metadata illustrated in FIG. 8 is stored in the application-side metadata storage unit 3, it can be said that the two applications 12 are in a state of giving a connection request to one sensor 11 simultaneously. The application "15777 (see FIG. 8)" has a higher "sensor usage fee" than the application "11837 (see FIG. 4)." Thus, a data providing destination of the sensor "192.168.223.47" is switched from the application "11837" to the application "15777" by the operations in Step S2a to S5 described above.

Subsequently, for example, in a case where a "sensor usage fee" of the application "11837 (see FIG. 4)" is rewritten, for example, to "700 yen or less/minute," Step S2a to S5 is executed again. Also, when the contents of the sensor-side metadata are rewritten or a condition requested by the application 12 to the sensor 11 (first variable value included in application-side metadata) is rewritten, the processing in Step S2a to S5 is executed again. Then, by execution of the processing in Step S2a to S5, an appropriate combination of a sensor 11 and an application 12 to perform data transmission/reception is determined according to a variation in a "sensor usage fee" or a condition requested by the application 12 to the sensor 11, and data transmission/reception between the sensor 11 and the application 12 is realized.

In the present exemplary embodiment, it can be also said that value of the sensor 11 varies as the number of applications 12 that give a connection request to the sensor 11 varies. In the present exemplary embodiment, the combination generating unit 4 generates a combination of an application 12 and a sensor 11 that satisfies a condition requested by the application 12. That is, the combination generating unit 4 can generate an appropriate combination of a data providing unit and a data acquiring unit in a case where value of the data providing unit varies. Then, the combination determining unit 5 determines a combination of a sensor 11 and an application 12 to perform data transmission/reception on the basis of a "sensor usage fee" set for the application 12, and the data transmission/reception control unit 6 transmits destination information of the application 12 to the sensor 11 included in the combination. Thus, in a situation in which value of a sensor 11 varies, a combination of a sensor 11 and an application 12 to perform data transmission/reception is determined on the basis of the "sensor usage fee," and data transmission/reception between the sensor 11 and the application 12 can be realized.

Also, as a result, a data provider who owns a sensor 11 having increased value can acquire a more "sensor usage fee" from a data user. Then, the data provider can use the fee for maintenance of the sensor 11, widening of a bandwidth of a communication path used by the sensor 11, and the like.

Note that in the second exemplary embodiment, a case where the combination determining unit 5 determines, in a case where there is a plurality of applications 12 combined with one sensor 11, a combination of an application 12 having the highest "sensor usage fee" among the applications 12 and the sensor 11 as a combination of a sensor 11 and an application 12 to perform data transmission/reception has been described. The combination determining unit 5 may specify an application 12 having a "sensor usage fee" that is the same as a usage fee described in sensor-side metadata or an application 12 having a "sensor usage fee" that is the closest to the usage fee described in the sensor-side metadata, and determine a combination of a sensor 11 and the application 12. In this case, the number of combinations of a sensor 11 and applications 12 which combinations are determined by the combination determining unit 5 can be easily increased.

Also, in the present invention, according to an instruction from the outside, the combination determining unit 5 may change a reference in determination of a combination of a sensor 11 and an application 12 to perform data transmission/reception. For example, in normal times, the combination determining unit 5 may determine a combination of a sensor 11 and an application 12 to perform data transmission/reception on the basis of a "sensor usage fee" in the application-side metadata as described in the second exemplary embodiment. Then, in an emergency, for example, in response to an instruction from an intermediary (owner of data transmission/reception control system 1), the combination determining unit 5 may change a reference in determination of a combination, and determine a combination of a sensor 11 and an application 12 to perform data transmission/reception on the basis of priority of the application 12, as described in the first exemplary embodiment.

Third Exemplary Embodiment

In the first exemplary embodiment and the second exemplary embodiment, a case where a data providing unit is a sensor 11 has been described. The sensor 11 provides data acquired by the sensor 11 as it is to a data providing destination.

A data providing unit may be a data processing unit that processes data acquired by a sensor and that provides the processed data to a data providing destination. In the third exemplary embodiment, a case where a data providing unit is the data processing unit will be described. Note that the data processing unit is not limited to data processing, and may be a means to analyze data acquired by a sensor and to generate new data.

In the third exemplary embodiment, data providing unit-side metadata is information related to the data processing unit.

In the following description, the data processing unit is conveniently referred to as an engine. Also, data providing unit-side metadata is conveniently referred to as engine-side metadata.

Figure 9:
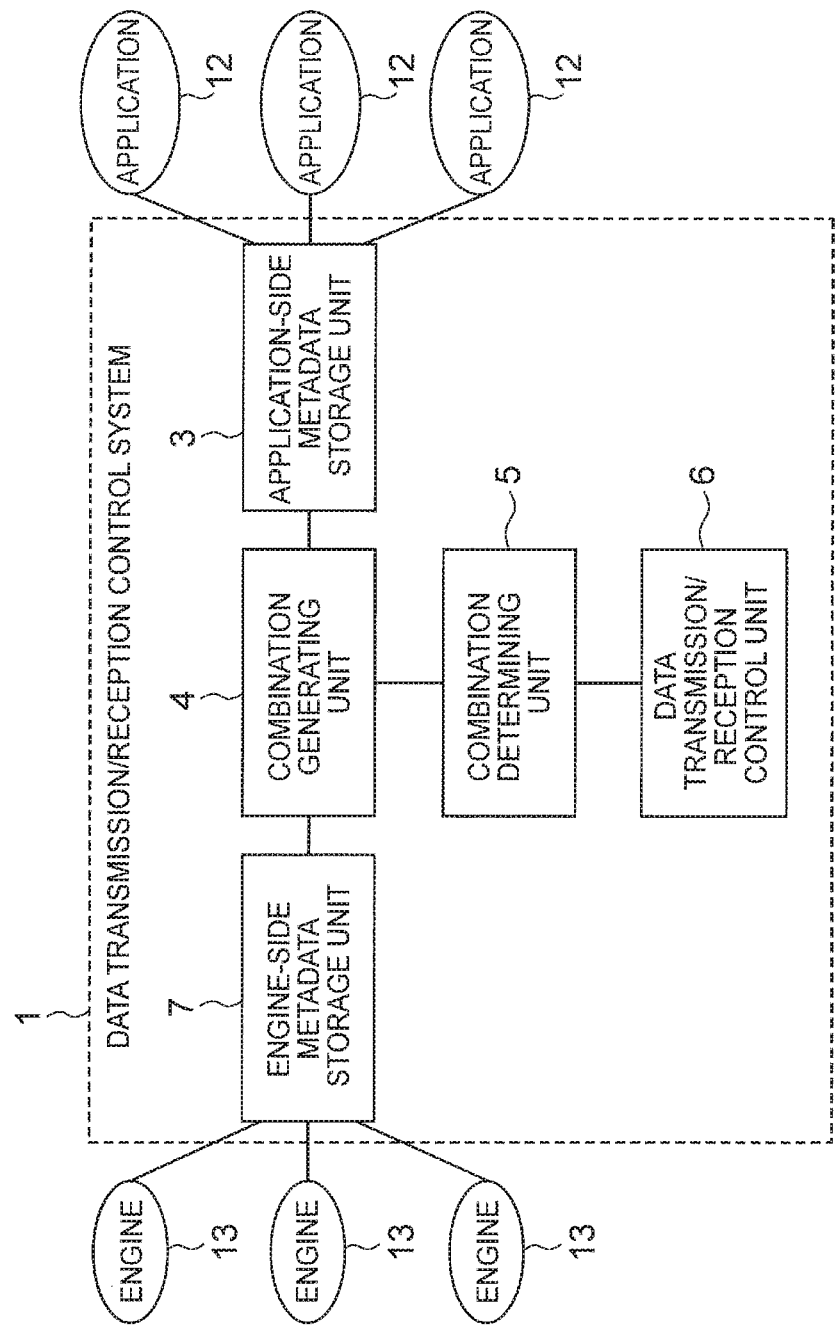
FIG. 9 It depicts a block diagram illustrating a configuration example of a data transmission/reception control system according to a third exemplary embodiment of the present invention.

FIG. 9 is a block diagram illustrating a configuration example of a data transmission/reception control system of the third exemplary embodiment of the present invention. A data transmission/reception control system 1 of the third exemplary embodiment includes an engine-side metadata storage unit 7 instead of the sensor-side metadata storage unit 2 in the first exemplary embodiment or the second exemplary embodiment.

An application-side metadata storage unit 3, a combination generating unit 4, a combination determining unit 5, and a data transmission/reception control unit 6 in the third exemplary embodiment are similar to the application-side metadata storage unit 3, the combination generating unit 4, the combination determining unit 5, and the data transmission/reception control unit 6 in the first exemplary embodiment or the second exemplary embodiment.

The engine-side metadata storage unit 7 stores engine-side metadata as data providing unit-side metadata. More specifically, the engine-side metadata storage unit 7 stores engine-side metadata of an engine 13 of a data provider who intends to provide data acquired by the engine 13.

In FIG. 9, three engines 13 are illustrated, but the number of engines is not specifically limited. The engines 13 do not need to be the same type of engines, and the engines 13 may be different types of engines.

Here, a difference between a sensor 11 and an engine 13 is that the engine 13 processes data acquired by the sensor 11 (not illustrated in FIG. 9) and provides the processed data while the sensor 11 provides data acquired by the sensor 11 as it is. It can be said that the sensor 11 and the engine 13 are common in an essential point of providing data.

Thus, it can be said that the engine-side metadata storage unit 7 is essentially similar to the sensor-side metadata storage unit 2 although being different from the sensor-side metadata storage unit 2 in a point that engine-side metadata is stored instead of sensor-side metadata.

Also, it can be said that the third exemplary embodiment is essentially similar to the first exemplary embodiment or the second exemplary embodiment although a point that the engine 13 is used instead of the sensor 11 is different from the first exemplary embodiment and the second exemplary embodiment.

FIG. 10 is a view for describing an example of engine-side metadata. An "ID" is an ID of an engine 13. A "type" indicates a type of the engine 13, and it is indicated in the example illustrated in FIG. 10 that the engine 13 executes a correlation analysis. A "usage fee" indicates a usage fee of the engine 13, and it is indicated in the example illustrated in FIG. 10 that a usage fee of the engine 13 is "500 yen/minute." The "usage fee" illustrated in FIG. 10 can be rewritten.

FIG. 11 and FIG. 12 are views for describing examples of application-side metadata in the third exemplary embodiment. In the examples illustrated in FIG. 11 and FIG. 12, an "ID" is an ID of an application 12. Also, a type indicates a type of the application 12. A type of the application 12 is a "real estate evaluation application" in the example illustrated in FIG. 11, and a type of the application 12 is a "beverage sales analysis application" in the example illustrated in FIG. 12.

An "engine usage fee" illustrated in FIG. 11 and FIG. 12 is a usage fee of an engine 13 when the application 12 uses the engine 13 (that is, receive data from engine 13). A value of the "engine usage fee" can be rewritten. The "engine usage fee" is one of conditions requested by the application 12.

"Priority" illustrated in FIG. 11 and FIG. 12 is similar to the "priority" in the first exemplary embodiment.

A "used engine" illustrated in FIG. 11 and FIG. 12 is a variable indicating a type of the engine 13 to be used by the application 12. The "used engine" is also one of the conditions requested by the application 12. Also, a value of the "used engine" can be rewritten.

Similarly to the first exemplary embodiment, in a case where the combination determining unit 5 determines a combination of an engine 13 and an application 12 on the basis of priority, the "engine usage fee" and the "used engine" correspond to a first variable and the "priority" corresponds to a second variable.

Also, similarly to the second exemplary embodiment, in a case where the combination determining unit 5 determines a combination of an engine 13 and an application 12 on the basis of a usage fee of the engine 13, the "engine usage fee" and the "used engine" correspond to a first variable, and the "engine usage fee" corresponds to a second variable. That is, in this case, the "engine usage fee" corresponds to both of the first variable and the second variable.

The engine-side metadata illustrated in FIG. 10 is different from the sensor-side metadata illustrated in FIG. 2 and FIG. 3, for example. Also, the application-side metadata illustrated in FIG. 11 and FIG. 12 is different from the application-side metadata illustrated in FIG. 4 and FIG. 5, for example. The application-side metadata illustrated in FIG. 11 and FIG. 12 includes a first variable and a second variable. Operations of the combination generating unit 4, the combination determining unit 5, and the data transmission/reception control unit 6 are similar to operations of those elements in the first exemplary embodiment or operations of those elements in the second exemplary embodiment, and a detailed description thereof is omitted.

The combination generating unit 4 generates all combinations of an application 12 and engines 13 that satisfy a condition requested by the application 12 by collating a value of the first variable (variable indicating condition requested by application 12 to engine 13) in the application-side metadata stored in the application-side metadata storage unit 3 with contents of the engine-side metadata stored in the engine-side metadata storage unit 7.

The engine-side metadata illustrated in FIG. 10 satisfies conditions indicated by a value of the "engine usage fee" and a value of the "used engine" illustrated in FIG. 11. Thus, the combination generating unit 4 generates a combination of an engine "135 (see FIG. 10)" and an application "12237 (see FIG. 11)." On the other hand, the engine-side metadata illustrated in FIG. 10 does not satisfy the condition indicated by the value of the "engine usage fee" illustrated in FIG. 12. Thus, a combination of the engine "135 (see FIG. 10)" and an application "12299" is not generated.

The combination determining unit 5 determines a combination of an engine 13 and an application 12 to perform data transmission/reception from the combination generated by the combination generating unit 4. Here, similarly to the first exemplary embodiment, the combination determining unit 5 may determine a combination of an engine 13 and an application 12 to perform data transmission/reception on the basis of priority included in application-side metadata of the application 12 included in the generated combination. Alternatively, similarly to the second exemplary embodiment, the combination determining unit 5 may determine a combination of an engine 13 and an application 12 to perform data transmission/reception on the basis of an "engine usage fee" included in the application-side metadata of the application 12 included in the generated combination.

In the third exemplary embodiment, an effect similar to those of the first exemplary embodiment and the second exemplary embodiment is acquired. However, a sensor described in an effect of the first exemplary embodiment or the effect of the second exemplary embodiment is replaced with an engine.

Also, according to an instruction from the outside, the combination determining unit 5 may change a reference in determination of a combination of an engine 13 and an application 12 to perform data transmission/reception. For example, the combination determining unit 5 may determine a combination of an engine 13 and an application 12 to perform data transmission/reception on the basis of the "engine usage fee" in the application-side metadata in normal times. Then, in an emergency, for example, in response to an instruction from an intermediary (owner of data transmission/reception control system 1), the combination determining unit 5 may change a reference in determination of a combination, and determine a combination of an engine 13 and an application 12 to perform data transmission/reception on the basis of priority of the application 12.

Figure 13:
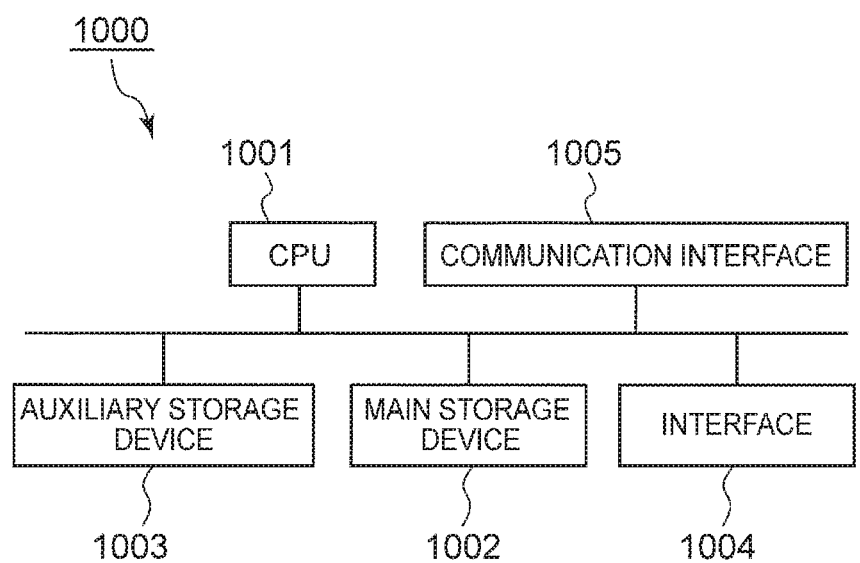
FIG. 13 It depicts a schematic block diagram illustrating a configuration example of a computer according to each exemplary embodiment of the present invention.

FIG. 13 is a schematic block diagram illustrating a configuration example of a computer according to each exemplary embodiment of the present invention. A computer 1000 includes a CPU 1001, a main storage device 1002, an auxiliary storage device 1003, an interface 1004, and a communication interface 1005.

The data transmission/reception control system 1 of each exemplary embodiment is implemented in the computer 1000. An operation of the data transmission/reception control system 1 is stored in a form of a data transmission/reception control program in the auxiliary storage device 1003. The CPU 1001 reads the program from the auxiliary storage device 1003, expands the program in the main storage device 1002, and executes the above processing according to the program. Note that the communication interface 1005 is a communication interface used when the CPU 1001 receives sensor-side metadata (or engine-side metadata) or application-side metadata, and transmits destination information of an application.

The auxiliary storage device 1003 is an example of a non-transitory tangible medium. Different examples of a non-transitory tangible medium include a magnetic disk, a magneto-optical disk, a compact disk read only memory (CD-ROM), a digital versatile disk read only memory (DVD-ROM), a semiconductor memory, and the like connected via the interface 1004. Also, in a case where this program is distributed to the computer 1000 via a communication line, the computer 1000 that receives the distribution may expand the program in the main storage device 1002 and execute the above processing.

Figure 14:
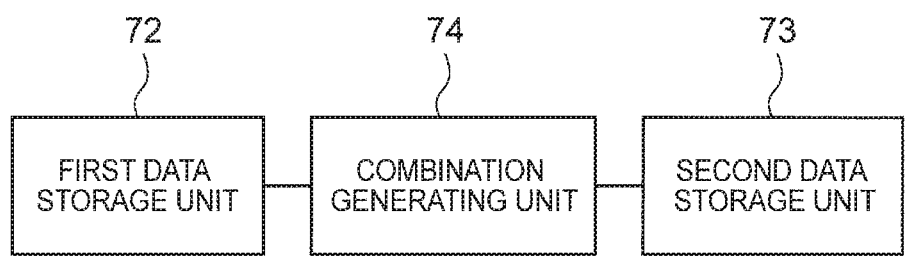
FIG. 14 It depicts a block diagram illustrating an outline of the present invention.

Next, an outline of the present invention will be described. FIG. 14 is a block diagram illustrating an outline of the present invention. A data transmission/reception control system of the present invention includes a first data storage unit 72, a second data storage unit 73, and a combination generating unit 74.

The first data storage unit 72 (such as sensor-side metadata storage unit 2 or engine-side metadata storage unit 7) stores first data (such as sensor-side metadata or engine-side metadata) that is information related to a data providing unit that provides data.

The second data storage unit 73 (such as application-side metadata storage unit 3) stores second data (such as application-side metadata) that is information related to a data acquiring unit to acquire data provided from a data providing unit and that includes condition information (such as first variable value) indicating a condition requested by the data acquiring unit to the data providing unit, and reference information (such as second variable value) to be a reference in determination of a combination of a data acquiring unit and a data providing unit.

The combination generating unit 74 (such as combination generating unit 4) generates a combination of a data acquiring unit and a data providing unit on the basis of the condition information and the first data.

The combination generating unit 74 generates a combination of a data acquiring unit and a data providing unit in a case where a variation is generated in at least one of the first data stored in the first data storage unit 72 and the second data stored in the second data storage unit 73.

With such a configuration, an appropriate combination of a data providing unit and a data acquiring unit can be generated in a case where value of the data providing unit varies.

Each of the above-described exemplary embodiments of the present invention can be described in a manner of the following supplementary notes, but is not limited to the following.

(Supplementary Note 1)

A data transmission/reception control system including:

a first data storage unit that stores first data that is information related to a data providing unit to provide data;

a second data storage unit that stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit; and a combination generating unit that generates a combination of the data acquiring unit and the data providing unit on the basis of the condition information and the first data, wherein the combination generating unit generates the combination of the data acquiring unit and the data providing unit in a case where a variation is generated in at least one of the first data stored in the first data storage unit and the second data stored in the second data storage unit.

(Supplementary Note 2)

The data transmission/reception control system according to supplementary note 1, further including:

a combination determining unit that determines a combination of the data acquiring unit and the data providing unit, on the basis of the reference information, from the combination generated by the combination generating unit; and a data transmission/reception control unit that causes the data acquiring unit and the data providing unit included in the combination determined by the combination determining unit to execute data transmission/reception.

(Supplementary Note 3)

The data transmission/reception control system according to supplementary note 1 or supplementary note 2, wherein the second data storage unit stores second data including priority of when the data acquiring unit receives provision of the data from the data providing unit, as the reference information, and the combination determining unit determines, in a case where there is a plurality of data acquiring units combined with one data providing unit, a data acquiring unit combined with the data providing unit on the basis of the priority.

(Supplementary Note 4)

The data transmission/reception control system according to supplementary note 1 or supplementary note 2, wherein the second data storage unit stores second data including a usage fee of the data providing unit, as the reference information, and the combination determining unit determines, in a case where there is a plurality of data acquiring units combined with one data providing unit, a data acquiring unit combined with the data providing unit on the basis of the usage fee.

(Supplementary Note 5)

The data transmission/reception control system according to any one of supplementary note 1 to supplementary note 4, wherein the combination determining unit changes a reference in determination of the combination of the data acquiring unit and the data providing unit according to an instruction from the outside.

(Supplementary Note 6)

The data transmission/reception control system according to any one of supplementary note 1 to supplementary note 5,
wherein the first data storage unit
stores information related to a sensor as the first data.
(Supplementary Note 7)
The data transmission/reception control system according to any one of supplementary note 1 to supplementary note 5,
wherein the first data storage unit
stores, as the first data, information related to a data processing unit that provides data acquired by processing of data output from a sensor.
(Supplementary Note 8)
A data transmission/reception control method in a computer including a first data storage unit that stores first data that is information related to a data providing unit to provide data, and
a second data storage unit that stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit,
the data transmission/reception control method including: by the computer, generating a combination of the data acquiring unit and the data providing unit on the basis of the condition information and the first data;
wherein the computer generates the combination of the data acquiring unit and the data providing unit in a case where a variation is generated in at least one of the first data stored in the first data storage unit and the second data stored in the second data storage unit.
(Supplementary Note 9)
A data transmission/reception control program installed in a computer including
a first data storage unit that stores first data that is information related to a data providing unit to provide data, and
a second data storage unit that stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit,
the data transmission/reception control program causing the computer
to execute combination generation processing of generating a combination of the data acquiring unit and the data providing unit on the basis of the condition information and the first data, and
to execute the combination generation processing in a case where a variation is generated in at least one of the first data stored in the first data storage unit and the second data stored in the second data storage unit.

Although the present invention has been described with reference to exemplary embodiments, the present invention is not limited to the above-described exemplary embodiments. Various modifications that can be understood by those skilled in the art can be made within the scope of the present invention with respect to a configuration or a detail of the present invention.

This application claims priority based on Japanese Patent Application No. 2017-153103 filed on Aug. 8, 2017, the entire disclosure of which is incorporated herein.

INDUSTRIAL APPLICABILITY

The present invention is suitably applied to a data transmission/reception control system that controls data transmission/reception between a data providing unit and a data acquiring unit.

REFERENCE SIGNS LIST

1 Data transmission/reception control system
2 Sensor-side metadata storage unit
3 Application-side metadata storage unit
4 Combination generating unit
5 Combination determining unit
6 Data transmission/reception control unit
11 Sensor
11 Application

What is claimed is:
1. A data transmission/reception control system comprising:
a first data storage unit that stores first data that is information related to a data providing unit to provide data;
a second data storage unit that stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit; and
a combination generating unit that generates a combination of the data acquiring unit and the data providing unit on the basis of the condition information and the first data,
wherein the combination generating unit
generates the combination of the data acquiring unit and the data providing unit in a case where a variation is generated in at least one of the first data stored in the first data storage unit and the second data stored in the second data storage unit,
wherein the data transmission/reception control system further comprises:
a combination determining unit that determines a combination of the data acquiring unit and the data providing unit, on the basis of the reference information, from the combination generated by the combination generating unit; and
a data transmission/reception control unit that causes the data acquiring unit and the data providing unit included in the combination determined by the combination determining unit to execute data transmission/reception,
wherein the combination determining unit changes a reference in determination of the combination of the data acquiring unit and the data providing unit according to an instruction from the outside.
2. The data transmission/reception control system according to claim 1,
wherein the second data storage unit
stores second data including priority of when the data acquiring unit receives provision of the data from the data providing unit, as the reference information, and
the combination determining unit
determines, in a case where there is a plurality of data acquiring units combined with one data providing unit, a data acquiring unit combined with the data providing unit on the basis of the priority.

3. The data transmission/reception control system according to claim 1,
wherein the second data storage unit
stores second data including a usage fee of the data providing unit, as the reference information, and
the combination determining unit
determines, in a case where there is a plurality of data acquiring units combined with one data providing unit, a data acquiring unit combined with the data providing unit on the basis of the usage fee.

4. The data transmission/reception control system according to claim 1,
wherein the first data storage unit
stores information related to a sensor as the first data.

5. The data transmission/reception control system according to claim 1,
wherein the first data storage unit
stores, as the first data, information related to a data processing unit that provides data acquired by processing of data output from a sensor.

6. A data transmission/reception control method in a computer including
a first data storage unit that stores first data that is information related to a data providing unit to provide data, and
a second data storage unit that stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit,
the data transmission/reception control method comprising: by the computer,
generating a combination of the data acquiring unit and the data providing unit on the basis of the condition information and the first data;
wherein the computer generates the combination of the data acquiring unit and the data providing unit in a case where a variation is generated in at least one of the first data stored in the first data storage unit and the second data stored in the second data storage unit,
wherein the data transmission/reception control method further comprises:

determining a combination of the data acquiring unit and the data providing unit, on the basis of the reference information, from the combination generated by the computer,
causing the data acquiring unit and the data providing unit included in the combination determined by the computer to execute data transmission/reception, and
changing a reference in determination of the combination of the data acquiring unit and the data providing unit according to an instruction from the outside.

7. A non-transitory computer-readable recording medium in which a data transmission/reception control program is recorded,
the data transmission/reception control program causing a computer that includes
a first data storage unit that stores first data that is information related to a data providing unit to provide data, and
a second data storage unit that stores second data that is information related to a data acquiring unit to acquire the data provided from the data providing unit, and including condition information indicating a condition requested by the data acquiring unit to the data providing unit and reference information to be a reference in determination of a combination of the data acquiring unit and the data providing unit,
to execute combination generation processing of generating a combination of the data acquiring unit and the data providing unit on the basis of the condition information and the first data, and
to execute the combination generation processing in a case where a variation is generated in at least one of the first data stored in the first data storage unit and the second data stored in the second data storage unit,
wherein the data transmission/reception control program causes the computer to execute:
processing of determining a combination of the data acquiring unit and the data providing unit, on the basis of the reference information, from the combination generated in the combination generation processing;
processing of causing the data acquiring unit and the data providing unit included in the combination determined by the computer to execute data transmission/reception, and
processing of changing a reference in determination of the combination of the data acquiring unit and the data providing unit according to an instruction from the outside.

* * * * *